United States Patent
Motono et al.

(10) Patent No.: US 7,217,313 B2
(45) Date of Patent: May 15, 2007

(54) DEHUMIDIFICATION SYSTEM AND DEHUMIDIFICATION METHOD

(75) Inventors: Hiroshi Motono, Tokyo-To (JP); Takashi Tanahashi, Tokyo-To (JP); Masaji Kurosawa, Tokyo-To (JP); Katsuhiro Yamashita, Tokyo-To (JP)

(73) Assignees: Tokyo Electron Limited, Tokyo-To (JP); Nichias Corporation, Tokyo-To (JP)

( * ) Notice: Subject to any disclaimer, the term of this patent is extended or adjusted under 35 U.S.C. 154(b) by 349 days.

(21) Appl. No.: 10/513,754

(22) PCT Filed: May 26, 2003

(86) PCT No.: PCT/JP03/06543

§ 371 (c)(1),
(2), (4) Date: Nov. 9, 2004

(87) PCT Pub. No.: WO03/101589

PCT Pub. Date: Dec. 11, 2003

(65) Prior Publication Data

US 2005/0172805 A1      Aug. 11, 2005

(30) Foreign Application Priority Data

May 30, 2002   (JP)   ............................. 2002-157761

(51) Int. Cl.
  *B01D 53/06*   (2006.01)
  *B01D 53/28*   (2006.01)

(52) U.S. Cl. ............................. 95/113; 95/123; 95/141; 96/125; 96/131

(58) Field of Classification Search .................. 95/113, 95/117, 121, 123, 126, 141, 148; 96/125, 96/131, 154; 252/194; 502/65; 165/6, 8, 165/10
See application file for complete search history.

(56) References Cited

U.S. PATENT DOCUMENTS 3,665,046 A     5/1972   De Rosset
5,584,916 A  *  12/1996  Yamashita et al. ............ 96/123

(Continued)

FOREIGN PATENT DOCUMENTS

CN       2114785 U      9/1992

(Continued)

OTHER PUBLICATIONS

"Zeolite" (Feb. 1, 1975 p. 61) and a partial English translation (hand marked sections "A" and "B").

(Continued)

*Primary Examiner*—Frank M. Lawrence
(74) *Attorney, Agent, or Firm*—Smith, Gambrell & Russell, LLP

(57) ABSTRACT

A dehumidifying system supplies a gas free of organic substances. The dehumidifying system includes a holding case, and a rotor rotatably held in the holding case and bearing an adsorbent. The interior of the holding case is divided into an adsorbing zone and a regenerating zone by partition plates attached to the holding case. A process gas is supplied into the adsorbing zone. The process gas processed in the adsorbing zone is supplied into an objective space. A regenerating gas is supplied into the regenerating zone to eliminate moisture and organic substances adsorbed by the adsorbent in the adsorbing zone from the adsorbent.

17 Claims, 11 Drawing Sheets

U.S. PATENT DOCUMENTS

| | | | | |
|---|---|---|---|---|
| 5,667,560 | A | * | 9/1997 | Dunne .................... 95/113 |
| 5,701,762 | A | * | 12/1997 | Akamatsu et al. ............ 62/636 |
| 5,702,505 | A | * | 12/1997 | Izumi et al. .................. 95/115 |
| 5,733,451 | A | * | 3/1998 | Coellner et al. ............ 210/496 |
| 2001/0026110 | A1 | * | 10/2001 | Kurosawa et al. .......... 310/261 |

FOREIGN PATENT DOCUMENTS

| | | |
|---|---|---|
| JP | 61-071821 | 4/1986 |
| JP | 05115737 | 5/1993 |
| JP | 6-350047 | 12/1994 |
| JP | 09-239263 | 9/1997 |
| JP | 11-188224 | 7/1999 |
| JP | 2000-033225 | 2/2000 |
| JP | 2000-296309 | 10/2000 |
| JP | 2001-137640 | 5/2001 |
| JP | 2001/276552 | 10/2001 |
| JP | 2001-276552 | 10/2001 |
| JP | 2001-334120 | 12/2001 |
| JP | 2002-028430 | 1/2002 |

OTHER PUBLICATIONS

International Preliminary Examination Report (PCT/IPEA/409) (translated) issued for PCT/JP2003/006543.

Notification of Transmittal of Copies of Translation of the International Preliminary Examination Report (PCT/IB/338) issued for PCT/JP2003/006543.

Chinese Office Action issued Dec. 29, 2006 (with English translation).

* cited by examiner

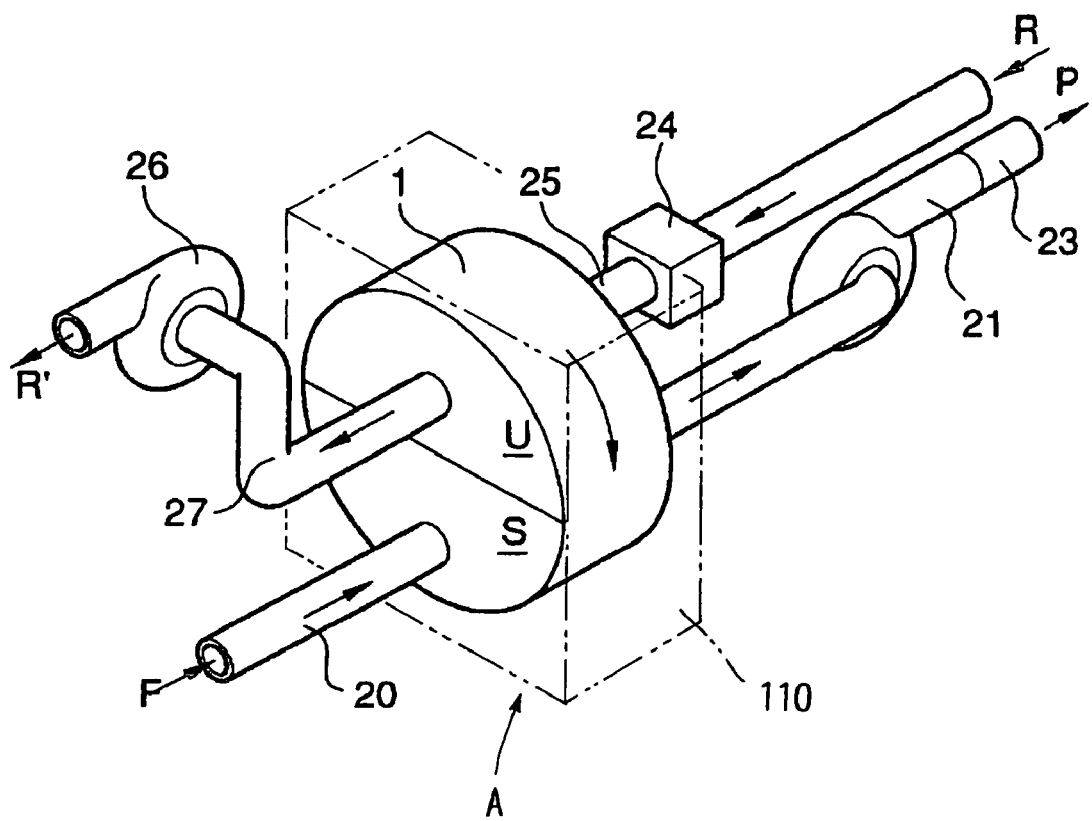
F I G. 1

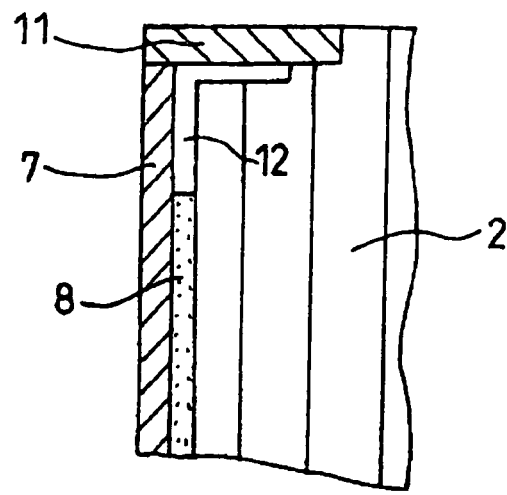
F I G. 8
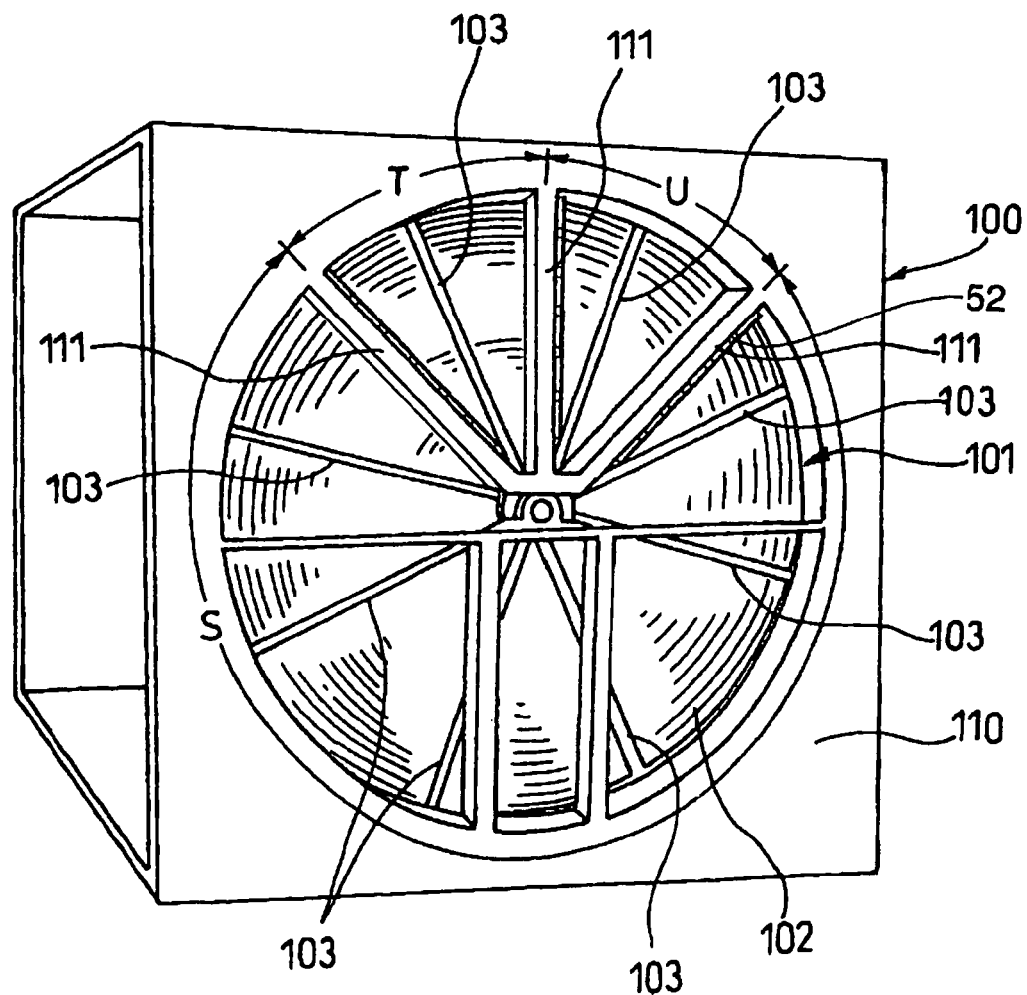
F I G. 9

DEHUMIDIFICATION SYSTEM AND DEHUMIDIFICATION METHOD

TECHNICAL FIELD

The present invention relates to a dehumidifying system that produces a clean, dry gas having a low dew point by passing a gas through an adsorbent to clean the gas and to remove moisture contained in the gas, and a dehumidifying method using the dehumidifying system.

BACKGROUND ART

A semiconductor device fabricating process for fabricating highly integrated semiconductor devices is required to use a gas not containing gaseous impurities and having a dew point of −50° C. or below. A dry dehumidifying device using a rotor provided with an adsorbent is used widely for producing clean, dry gas having such a low dew point.

A dehumidifying device for producing dry air having a low dew point is disclosed in, for example, JP 63-50047 B. The device is provided with a cylindrical honeycomb rotor formed by winding a single-sided corrugated board around an axis of rotation and having many parallel gas passages. The single-sided corrugated board is formed by processing a special paper sheet containing activated carbon and a ceramic material as principal components. Process gas passages, regenerating gas passages and virgin gas passages are formed separately around the axis of rotation. The process gas is passed through the rotating honeycomb rotor to dehumidify the process gas. Moisture removed from the process gas is carried away by the regenerating gas. This dry dehumidifying system has an adsorbent produced by fixing lithium chloride in pores of the activated carbon.

A dry dehumidifying system for producing dry air having a low dew point disclosed in JP 11-188224 A uses lithium chloride, silica gel or zeolite as an adsorbent.

A rotor of the dry dehumidifying device will be explained. The rotor is held rotatably in a case. A rotor and a case disclosed in JP 2001-276552 A will be described by way of example. Referring to FIGS. 11 and 12, a dry dehumidifying device 100 includes a case 110 provided with radial partition plates 111, and a rotor 101 rotatably held in the case 110. The rotor 101 is divided temporarily into parts by the partition plates 111 in an adsorbing zone S, a cooling zone T and a regenerating zone U as the rotor 101 rotates. Process air flows into the part of the rotor 101 in the adsorbing zone S through one of the opposite end surfaces of the rotor 101, for example, a front end surface on the front surface of the paper shown in FIG. 11.

The rotor 101 is formed by shaping a honeycomb base sheet 104 and has, for example, eight sectors 102 having a sectorial cross section and bearing an adsorbent. The sectors 102 are joined together in a cylindrical structure. The sectors 102 are reinforced by metal spokes 103. A metal rim 107 is put on the cylindrical structure formed by joining the sectors 102. As shown in an enlarged view in FIG. 13, each sector 102, the metal spoke 103 and the rim 107 are joined together or adhesively bonded together with a caulking material 120, such as heat-resistant silicone.

In the adsorbing zone S, moisture contained in the process air is adsorbed by the adsorbent borne by the rotor 101. Clean, dry air leaves the rotor 101 through the other end surface, namely, a front end surface on the back surface of the paper in FIG. 11, of the rotor 101. In the regenerating zone U, hot air heated at temperatures between about 180 and about 200° C. flows through the back end surface of the rotor 101 and flows through the rotor 101 to evaporate and carry away moisture adsorbed by the rotor 101 in the adsorbing zone S. The rotor 101 is exposed to hot air of a high temperature and is heated. If the hot rotor 101 moves through the adsorbing zone S, the process air cannot be dehumidified and the process air passed through the rotor 101 has a high dew point. Therefore, the cooling zone T is interposed between the regenerating zone U and the adsorbing zone S to cool the rotor 101.

Sealing members formed by laminating a PTFE film to a fluororubber sheet are attached to the partition plates 111 demarcating the adsorbing zone S, the regenerating zone U and the cooling zone T. The sealing members are pressed slidably against the end surfaces of the rotor 101 to prevent the leakage of the process air and the mixing of the process air and the hot air.

The dehumidifying device 100 has a limited dew point lowering ability. Usually, two dehumidifying devices are cascaded as mentioned in JP 63-50047 B. The two dehumidifying devices are connected such that the process air passed through an adsorbing zone in one of the two dehumidifying devices flows into an adsorbing zone in the other dehumidifying device. A dehumidifying system disclosed in JP 11-188224 A has three cascaded dehumidifying devices for further dew point lowering.

The semiconductor device fabricating process uses various chemicals, and produces a large variety of organic compounds including those of molecules having large diameters, those of molecules having small diameters, those having low boiling points and those having high boiling points.

Although the known dehumidifying devices are capable of satisfactorily adsorbing moisture, they are not satisfactory in organic compound adsorbing capacity. Thus, organic compounds contained in the process air could not be satisfactorily adsorbed by the known dehumidifying devices and some part of the organic compounds contained in the process gas is carried away by the process air leaving the dehumidifying device.

Accordingly, it is a first object of the present invention to remove both moisture and organic compounds.

Moreover, the semiconductor device fabricating process produces a large amount of gaseous, high-boiling organic compounds, such as DMSO (dimethyl sulfoxide), MEA (monoethanol amine) and HMDS (hexamethylenedisilazane). Although the known dry dehumidifying devices are able to adsorb those high-boiling organic compounds, the adsorbent of the dry dehumidifying device adsorbing those high-boiling organic compounds cannot be regenerated, because the adsorbent needs to be heated at a temperature on the order of 300° C. to remove the adsorbed high-boiling organic compounds from the adsorbent and the adsorbent is unable to withstand such a high temperature. For example, the highest temperature that can be withstood by activated carbon is on the order of 140° C. It is possible that activated carbon ignites if activated carbon is exposed to high-temperature air of temperatures exceeding 300° C. Therefore, activated carbon cannot be used. Silica gel cannot be used because the ability of silica gel deteriorates if silica gel is exposed to high-temperature air of temperatures exceeding 300° C. Hot air of very high temperatures exceeding 300° C. must be used to remove the high-boiling organic compounds in the regenerating zone U.

The caulking material 120, such as heat-resistant silicone, is unable to withstand high temperatures exceeding 200° C. The bonding ability or adhesive strength of the caulking material 120 caulking gaps between the metal spokes 103 and the sectors 102 deteriorates when high-temperature air of 300° C. or above flows through the rotor 101. Consequently, the sectors 102 fall off the rotor 101 and, in some cases, the rotor 101 becomes unserviceable. Since high-temperature air cannot be passed through the rotor 101, high-boiling organic compounds are continuously accumulated in the rotor 101 and the adsorbing ability of the adsorbent decreases accordingly.

Since the temperature of air that flows through the regenerating zone U of the rotor 101 is limited, the accumulated high-boiling organic compounds cannot satisfactorily be removed, the cleaning and dehumidifying abilities of the rotor 101 decrease and hence the rotor 101 needs to be replaced inevitably with a new one. A regenerating method of regenerating the deteriorated rotor 101 washes the rotor 101 with water. However, this regenerating method is unable to remove organic substances, particularly, high-boiling organic substances satisfactorily, and is unable to restore the rotor 101 to its initial ability. Water used for washing the rotor 101 needs to be treated by a waste water treatment, which is very expensive.

Accordingly, it is a second object of the present invention to provide a dehumidifying system using an adsorbent that can be regenerated by heat of a high temperature on the order of 300° C. after adsorbing high-boiling organic compounds.

DISCLOSURE OF THE INVENTION

It is an object of the present invention to provide a high-performance durable dehumidifying device capable of removing organic substances including high-boiling organic compounds and of producing clean, dry air having a low dew point, and having heat resistance capable of satisfactorily withstanding high-temperature gases of temperatures exceeding 300° C., a dehumidifying system employing the dehumidifying device, and a dehumidifying method employing the dehumidifying system.

The present invention provides a dehumidifying system including a dehumidifying device capable of removing moisture and organic substances from a process gas, wherein the dehumidifying device includes a holding case and a rotor rotatably held in the holding case and bearing an adsorbent capable of adsorbing moisture and organic substances; at least an adsorbing zone and a regenerating zone are defined in the holding case holding the rotor by partition plates attached to the holding case, a first supply line for supplying the process gas and a first discharge line for discharging the processed process gas are connected to the adsorbing zone of the holding case holding the rotor, a second supply line for supplying a regenerating gas and a second discharge line for discharging the regenerating gas are connected to the regenerating zone of the holding case holding the rotor, and moisture and organic substances adsorbed by the adsorbent are eliminated from the adsorbent in the regenerating zone.

The dehumidifying system according to the present invention is characterized in that the dehumidifying device consists of first and second dehumidifying devices, the first discharge line connected to the adsorbing zone of the first dehumidifying device is connected to the first supply line connected to the adsorbing zone of the second dehumidifying device, and the first discharge line connected to the second dehumidifying device is connected to an objective space.

The dehumidifying system according to the present invention is characterized in that a gas cooling device is interposed between the first discharge line connected to the adsorbing zone of the first dehumidifying device and the first supply line connected to the adsorbing zone of the second dehumidifying device.

The dehumidifying system according to the present invention is characterized in that the second discharge line connected to the regenerating zone of the second dehumidifying device is connected to the second supply line connected to the regenerating zone of the first dehumidifying device.

The dehumidifying system according to the present invention is characterized in that a heater is interposed between the second discharge line connected to the regenerating zone of the second dehumidifying device and the second supply line connected to the regenerating zone of the first dehumidifying device.

The dehumidifying system according to the present invention is characterized in that the process gas is air, oxygen gas or inert gas.

The dehumidifying system according to the present invention is characterized in that the regenerating gas is a hot gas heated at a temperature between 250 and 400° C.

The dehumidifying system according to the present invention is characterized in that the interior of the holding case holding the rotor is divided into an adsorbing zone, a regenerating zone and a cooling zone by a partition plate attached to the holding case.

The dehumidifying system according to the present invention is characterized in that the rotor is provided with a honeycomb structure having many small pores and bearing the adsorbent.

The dehumidifying system according to the present invention is characterized in that the adsorbent contains aluminosilicate obtained by substituting some of sodium atoms of hydrophilic zeolite by a rare earth element.

The dehumidifying system according to the present invention is characterized in that the honeycomb structure of the rotor bears the adsorbent, and has a plurality of sector portions having a sectorial cross section and connected by spokes, and heat-insulating seals are held between the sector portions and the spokes.

The dehumidifying system according to the present invention is characterized in that the heat-insulating seals are silicon nitride plates, expanded graphite sheets or laminates each consisting of an expanded graphite sheet and a metal plate.

The dehumidifying system according to the present invention is characterized in that the adsorbent is a rare earth element-substituted aluminosilicate having a chemical composition indicated by: $aM_xO_y \cdot bNa_2O \cdot cAl_2O_3 \cdot dSiO_2 \cdot eH_2O$, where M is a rare earth element, the rare earth element-substituted aluminosilicate contains one or some of $La_2O$, $Nd_2O_3$, $CeO_3$, $Pr_6O_{11}$ as $aM_xO_y$, 5% by weight or less $Na_2O$ as $bNa_2O$, 10 to 35% by weight $Al_2O_3$ as $cAl_2O_3$ and 20 to 80% by weight $SiO_2$ as $dSiO_2$.

The dehumidifying system according to the present invention is characterized in that the process gas contains organic substances respectively having boiling points not lower than 200° C.

The present invention provides a dehumidifying method using a dehumidifying system including a dehumidifying device including a holding case, and a rotor rotatably held in the holding case and bearing an adsorbent capable of adsorbing moisture and organic substances, the holding case having at least an adsorbing zone and a regenerating zone defined by partition plates attached thereto, the dehumidifying method including the steps of: passing a process gas through the adsorbing zones of the holding cases holding the rotor to adsorb moisture and organic substances contained in the process gas by the adsorbent of the rotor; and passing a regenerating gas through the regenerating zones of the holding case holding the rotors to eliminate moisture and organic substances adsorbed by the adsorbent from the adsorbent.

The dehumidifying method according to the present invention is characterized in that the dehumidifying device consists of first and second dehumidifying devices, and the dehumidifying method further includes the steps of passing the process gas which has passed through the adsorbing zone of the first dehumidifying device through the adsorbing zone of the second dehumidifying device, and supplying the process gas which has passed through the adsorbing zone of the second dehumidifying device into an objective space.

The dehumidifying method according to the present invention is characterized in that part of the process gas which has passed through the adsorbing zone of the second dehumidifying device is supplied into the objective space, and the rest of the process gas which has passed through the adsorbing zone of the second dehumidifying device is heated and the heated process gas is supplied into the regenerating zone of the first dehumidifying device.

The dehumidifying method according to the present invention is characterized in that the process gas is air, oxygen gas or inert gas.

The dehumidifying method according to the present invention is characterized in that the regenerating gas is a hot gas heated at a temperature between 250 and 400° C.

The dehumidifying method according to the present invention is characterized in that the process gas contains organic substances respectively having melting points not lower than 200° C.

Aluminosilicate, obtained by substituting some of the sodium atoms of hydrophilic zeolite by a rare earth element and used as the adsorbent, is capable of efficiently adsorbing moisture and organic substances and improves the dehumidifying ability and the cleaning ability of the dehumidifying device. A clean, dry gas having a lower dew point can be produced by connecting the first and the second dehumidifying devices such that the process gas discharged from the adsorbing zone of the first dehumidifying device (hereinafter referred to as "front dehumidifying device") is supplied into the adsorbing zone of the second dehumidifying device (hereinafter referred to as "back dehumidifying device"). A high-temperature gas of a temperature exceeding 300° C. can be passed through the regenerating zone by isolating the sectors with heat-insulating seals placed in the joints of the sectors. Consequently, high-boiling organic compounds will not be accumulated in the dehumidifying device, and the rotor replacing period can be extended.

BRIEF DESCRIPTION OF THE DRAWINGS

FIG. 1 is a schematic view of a dehumidifying system in a first embodiment according to the present invention;

FIG. 8 is a sectional view taken on the line Y—Y in FIG. 2, showing a part of the heat-insulating structure near the rim;

FIG. 9 is a perspective view of a dehumidifying system having an adsorbing zone S, a regenerating zone U and a cooling zone T in a modification of the dehumidifying system in the first embodiment;

BEST MODE FOR CARRYING OUT THE INVENTION

Preferred embodiments of the present invention will be described with reference to the accompanying drawings.

First Embodiment

FIG. 1 is a schematic typical view of a first embodiment according to the present invention and FIGS. 2 to 8 are views of particulars of the dehumidifying system, particularly, heat-insulating structure. Referring to FIG. 1, the dehumidifying system has a dehumidifying device A capable of removing moisture and organic substances from a process gas containing the moisture and the organic substances.

The dehumidifying device A has a holding case, 110, and a rotor 1 rotatably held in the holding case 110 and bearing an adsorbent capable of adsorbing moisture and organic substances.

Figure 4:
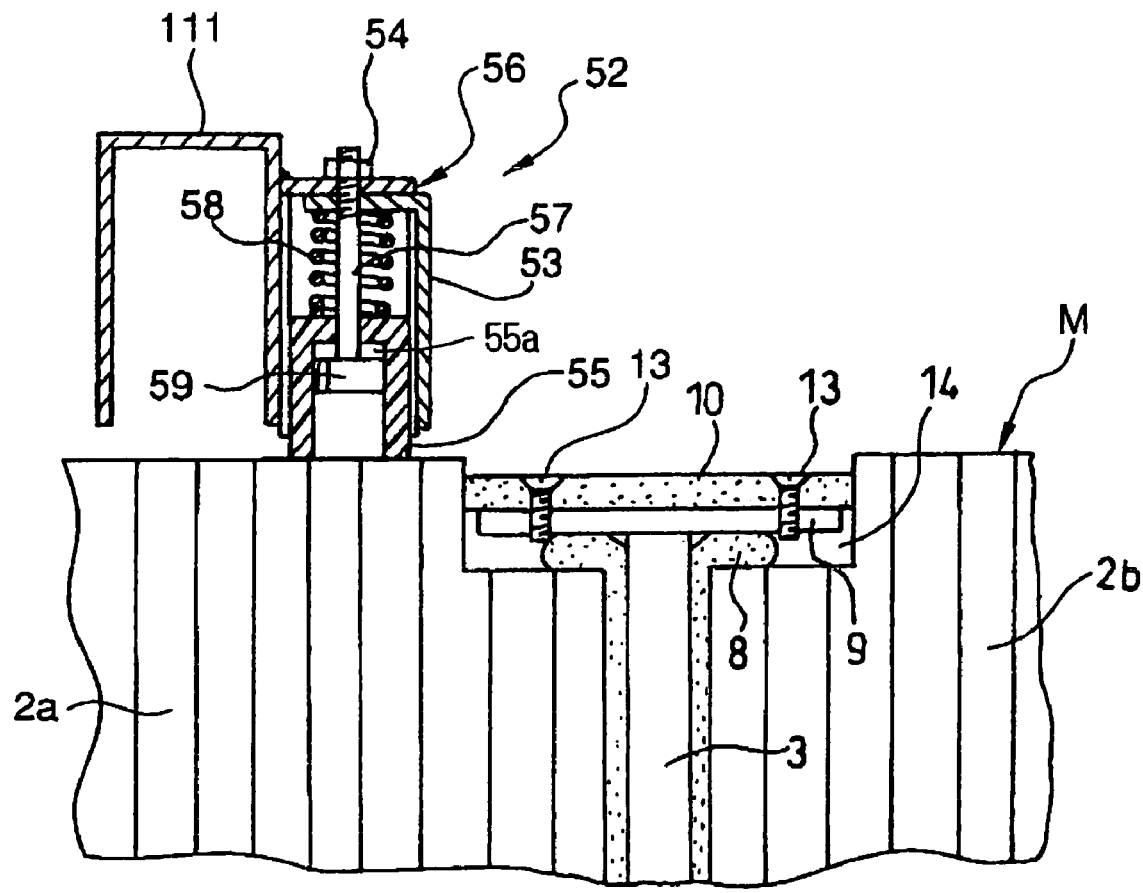
FIG. 4 is a sectional view taken on the line X—X in FIG. 2, showing a heat-insulating structure placed in the joint of sectors.
Figure 11:
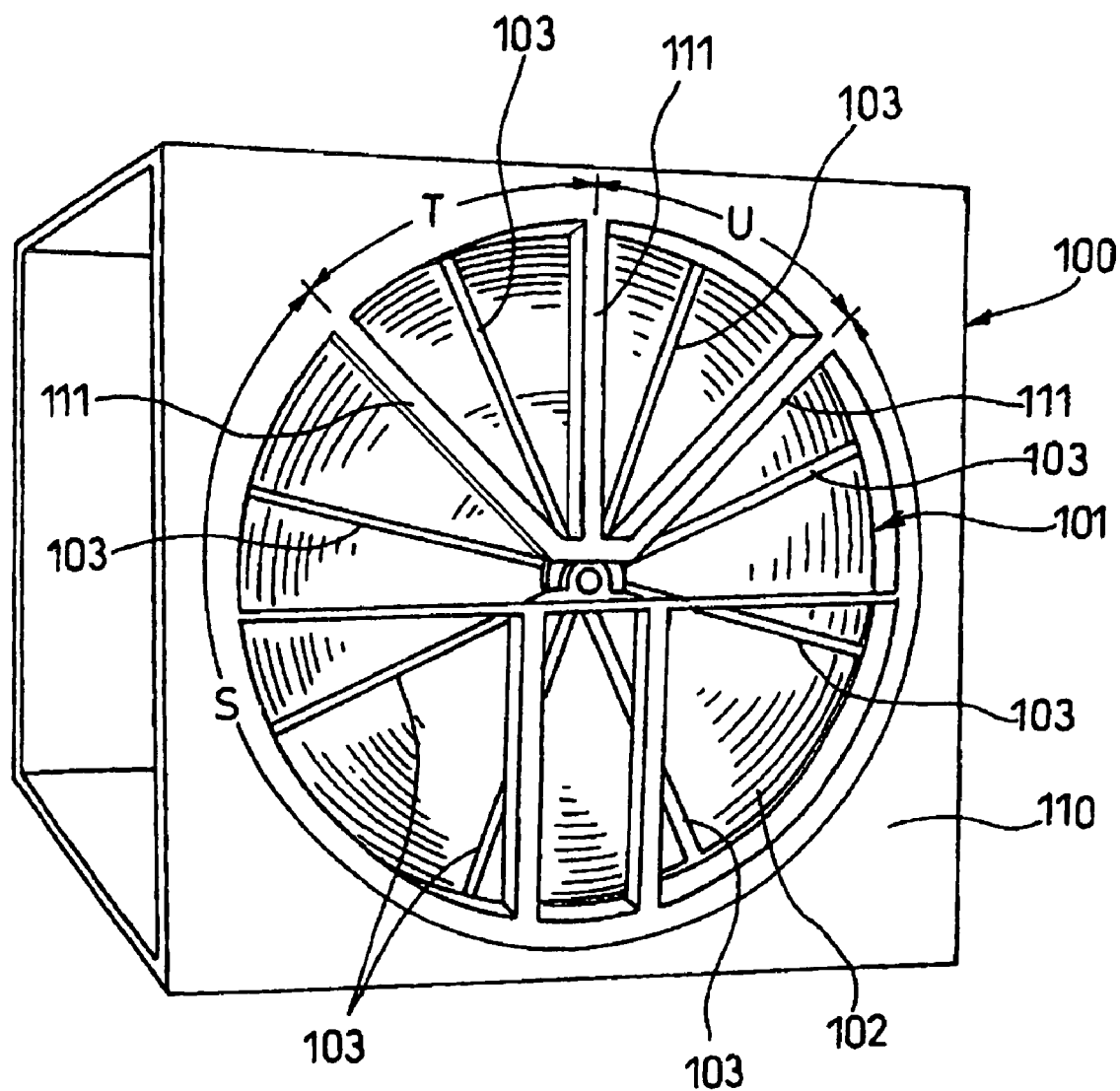
FIG. 11 is a perspective view showing the general construction of a prior art dehumidifying system including holding cases.
Figure 12:
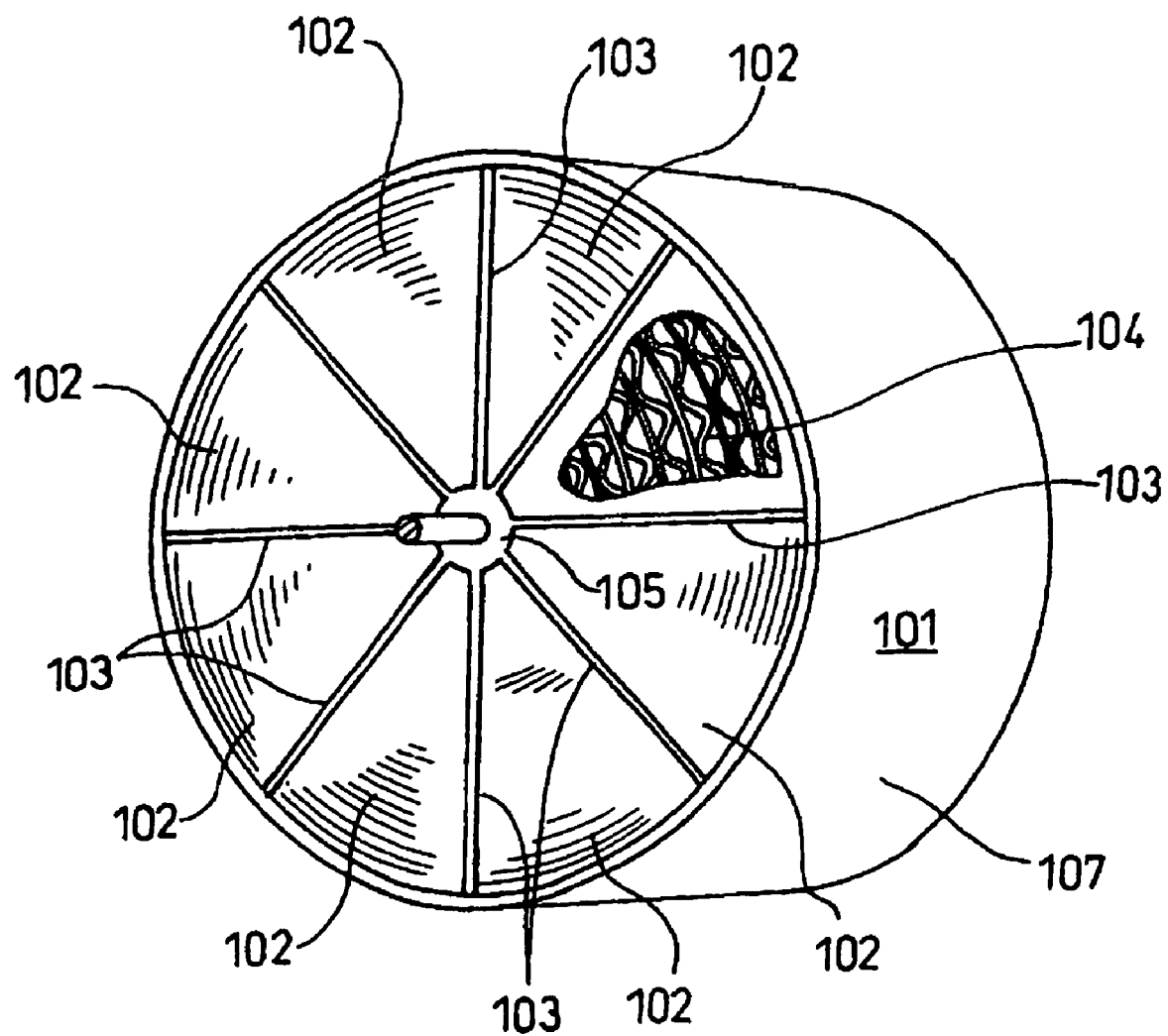
FIG. 12 is a perspective view of a rotor included in a prior art dehumidifying device.
Figure 13:
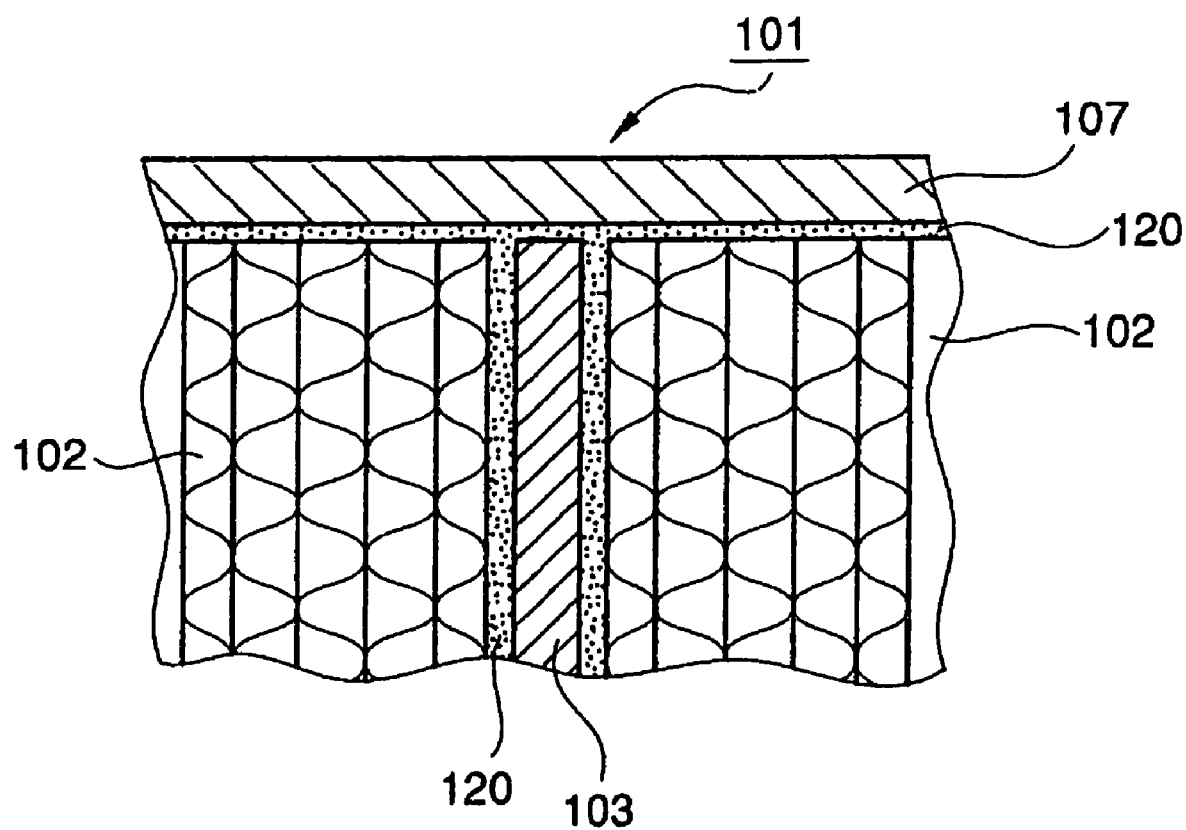
FIG. 13 is a view of assistance in explaining a mode of joining together sectors, a spoke and a rim of the prior art dehumidifying system.

The rotor 1 bears the adsorbent. The holding case 110 holding the rotor 1 has an adsorbing zone S and a regenerating zone S defined by radial partition plates 111 (FIGS. 4, 9 and 11).

As shown in FIG. 1, a process gas supply pipe 20 (first supply line) for carrying a process gas F is connected to one end surface, namely, a left end surface as viewed in FIG. 1, (hereinafter referred to as "front surface") of the adsorbing zone S. A clean gas discharge pipe (first discharge line) 23 provided with a fan 21 is connected to the other end surface, namely, a right end surface as viewed in FIG. 1, (hereinafter referred to as "back surface"). The process gas F is air, oxygen gas or inert gas. The process gas F is carried through the supply pipe 20 into the adsorbing zone S. The adsorbent born by the rotor 1 adsorbs moisture and organic substances contained in the process gas F to produce a clean, dry gas P. The clean, dry gas P is carried through the clean gas discharge pipe 23 to a desired space, not shown, such as a clean room.

A regenerating gas supply pipe (second supply line) 25 for carrying a regenerating gas R is connected to the back surface of the regenerating zone U. A waste gas discharge pipe (second discharge line) 27 provided with a fan 26 is connected to the front surface of the regenerating zone U. A heater 24 is placed in the regenerating gas supply pipe 25 to heat the regenerating gas R at a temperature between 130 and 200° C. before the regenerating gas R flows into the regenerating zone U. The hot regenerating gas R separates moisture and gaseous impurities (organic substances) adsorbed by the adsorbent of the rotor 1 in the regenerating zone U to eliminate the moisture and the organic substances from the process gas F. The regenerating gas R passed through the regenerating zone U is discharged to be a waste gas R', and the flows through the waste gas discharge pipe 27 provided with the fan 26 and connected to the front surface of the regenerating zone U.

While the dehumidifying device is in a normal operation, the regenerating gas heated at a temperature between about 130 and about 200° C. is used for eliminating moisture and gaseous impurities (organic substances) adsorbed by the adsorbent, high-boiling organic compounds to be adsorbed by the adsorbent used by the present invention cannot be eliminated by the regenerating gas of such a temperature. Since the rotor 1 is provided with heat-insulating structures, which will be described later, the regenerating gas can be heated at a temperature effective in eliminating high-boiling organic compounds from the adsorbent. Although a method of regenerating the adsorbent is dependent on the operating mode of the dehumidifying device A, it is preferable to pass the regenerating gas heated at a temperature between about 250 and about 400° C. at a velocity of 1 m/s or higher to eliminate high-boiling organic compounds from the adsorbent when the high-boiling organic compounds are accumulated in the adsorbent in a period in the range of about six months to about two years. A suitable regenerating time is in the range of about 6 to about 15 hr.

The rotor 1 includes eight sectors (sector portions) 2, each having a sectorial cross section. The sector portions 2 are assembled in a cylindrical structure, and the cylindrical structure of the sector portions 2 is held in a cylindrical rim 7. The interior of the rim 7 is divided into divisions having a sectorial cross section by radial spokes 3. Each of the sector portions 2 is formed from a honeycomb sheet 4 bearing the adsorbent.

The adsorbent is capable of efficiently adsorbing organic substances together with moisture. Preferably, the adsorbent is aluminosilicate obtained by substituting some of sodium atoms of hydrophilic zeolite by a rare earth element. There are various types of aluminosilicate differing from each other in the structure of tunnels (diameter of pores) in crystalline structure dependent on the values of x and y of a chemical formula: $xM_2/nAl_2O_3 ySiO_2$ (M is an n-valent metal). Preferably, the adsorbent employed in the present invention is aluminosilicate obtained by substituting some of sodium atoms of A-type zeolite ($Na_2O.Al_2O_3.2SiO_2.4.5H_2O$), X-type zeolite ($Na_2O.Al_2O_3.2.5SiO_2.6H_2O$) or Y-type zeolite ($Na_2O.Al_2O_3.4.8SiO_2.8.9H_2O$) by a rare earth element.

The rare earth element-substituted aluminosilicate is expressed by a chemical formula: $aM_xO_y.bNa_2O.cAl_2O_3.dSiO_2.eH_2O$ (M: rare earth element). The rare earth element substituted aluminosilicate may contain one or a plurality of kinds of rare earth elements. Preferably, $aM_xO_y$ is $La_2O_3$, $Nd_2O_3$, $CeO_3$ or $Pr_6O_{11}$, and the $aM_xO_y$ content of the rare earth element-substituted aluminosilicate is 1% by weight or above. It is most preferable to use $La_2O_3$ as $aM_xO_y$. A desirably $aM_xO_y$ content for a high adsorbing effect is in the range of 4 to 10% by weight. The upper limit of the $La_2O_3$ content is 10% by weight, and the respective upper limits of the $Nd_2O_3$ content, the $CeO_3$ content and the $Pr_6O_{11}$ content are on the order of 5% by weight. Naturally, those contents may be greater than those upper limits mentioned above.

As regards the rest of the components, it is preferable that $bNa_2O$ is $Na_2O$ and the $Na_2O$ content is 5% by weight or below, $cAl_2O_3$ is $Al_2O_3$ and the $Al_2O_3$ content is in the range of 10 to 35% by weight, $dSiO_2$ is $SiO_2$ and the $SiO_2$ content is in the range of 20 to 80% by weight. A particularly preferable rare earth element-substituted aluminosilicate has a $La_2O_3$ content of 6% by weight, a $Na_2O$ content of 3% by weight, an $Nd_2O_3$ content of 2% by weight, a $CeO_3$ content of 2% by weight, a $Pr_6O_{11}$ content of 2% by weight, an $Al_2O_3$ content of 27% by weight and a $SiO_2$ content of 8% by weight.

Preferably, the base sheet 4 excellent in heat resistance and abrasion resistance is formed by shaping a sheet of inorganic fibers in a honeycomb shape. The base sheet 4, namely, a honeycomb structure of a sheet of inorganic fibers, can be impregnated with the rare earth element-substituted aluminosilicate by applying a slurry containing the rare earth element-substituted aluminosilicate and an inorganic binder, such as a silica sol, to the base sheet 4 by spraying or brushing, and drying the base sheet 4 impregnated with the slurry.

Figure 5:
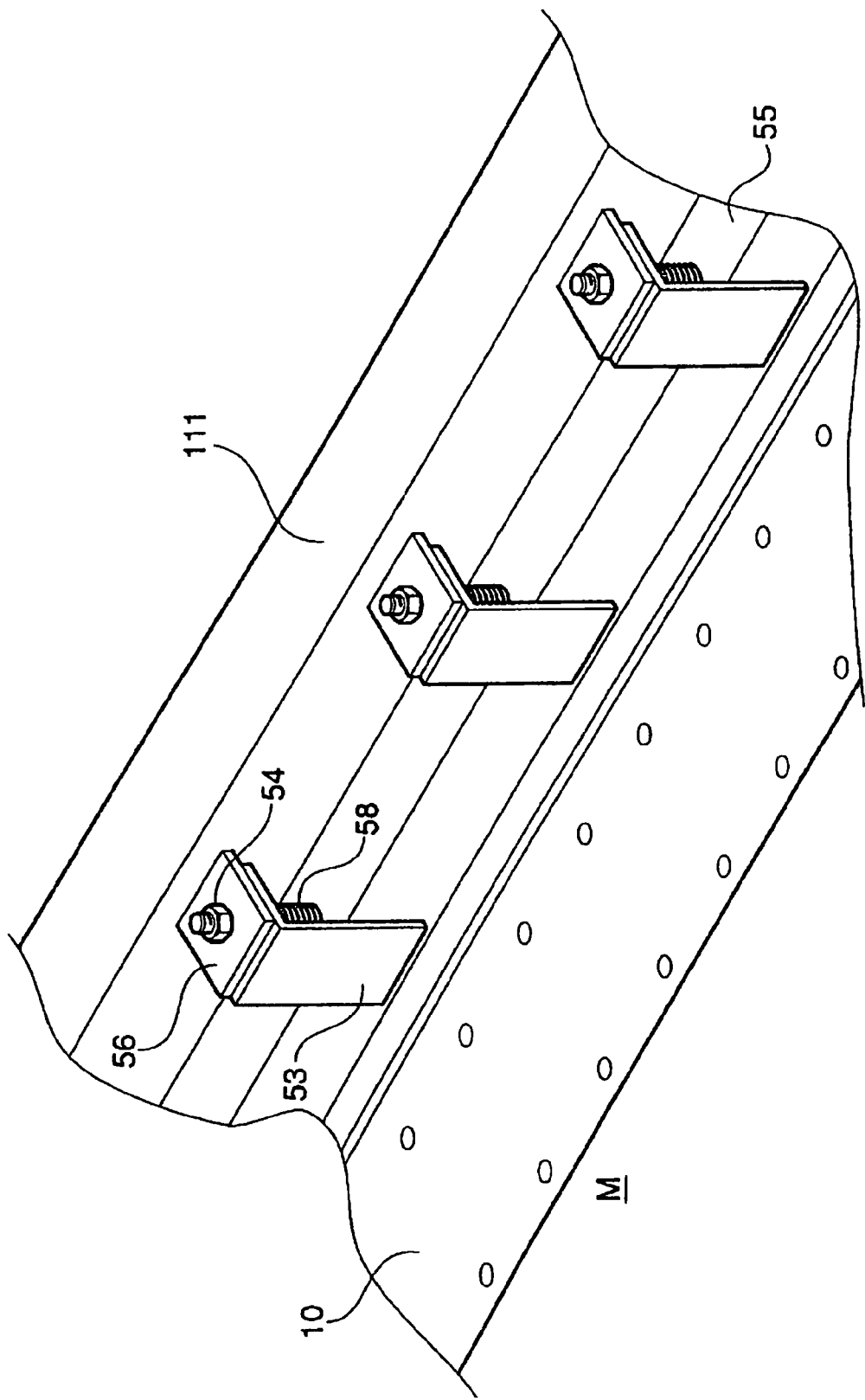
FIG. 5 is an enlarged perspective view of a peripheral part of a heat-insulating seal and a sealing device shown in FIG. 4.

A silicone caulking material 8, preferably, a fluororubber caulking material members are placed in joints of the adjacent joining surfaces of the sector portions 2, the spokes 3 and the rim 7. The joints are covered with heat-insulating seals 10 and 11 of a noninflammable material. The heat-insulating seals 10 and 11 are heat-resistant, heat-insulating, abrasion-resistant and solvent-resistant. As shown in FIGS. 4 and 5, the heat-insulating seals 10 and 11 are used to prevent the heat deformation of the caulking material members 8 filling up gaps between the spokes 3 supporting the sector portions 2a and 2b, and the sector portions 2 under heat of high temperatures that occurs when the joining surfaces of the sector portions 2a and 2b are heated at a high temperature. The heat-insulating seals 10 and 11 are capable of withstanding a high-temperature of 300° C. or above necessary for evaporating high-boiling compounds. The heat-insulating seals 10 and 11 have a high heat resistance sufficient to protect the caulking material members 8 from a hot gas of 300° C. or above. The heat-insulating seals 10 and 11 must be abrasion-resistant because the heat-insulating seals 10 and 11 come into contact with sealing members, which will be described later. The heat-insulating seals 10 have solvent resistance against organic substances contained in the process gas.

The heat-insulating seals 10 and 11 having properties meeting those conditions are formed of an inflammable material, such as silicon nitride, graphite, ceramic paper or inorganic felt. The heat-insulating seals 10 and 11 are plates or sheets of an inflammable material.

The heat-insulating construction of the rotor will be described with reference to FIGS. 3 to 8.

Referring to FIG. 4, the metal spoke 3 is bonded or adhesively joined to the two adjacent sector portions 2a and 2b with the caulking material members 8. A holding plate 9 of a metal is welded to the spoke 3 so as to extend perpendicularly to the spoke 3, i.e., so as to extend parallel to the end surface M of the sector portions 2a and 2b. The heat-insulating seal 10, namely, a silicon nitride plate, is fastened to the holding plate 9 with screws 13. Since the silicon nitride plate is attached to the spoke 3 with the screws 13, a complicated forming process for forming a silicon nitride plate that is attached integrally to the spoke 3 is not necessary, and the silicon nitride plate can be easily changed.

Figure 2:
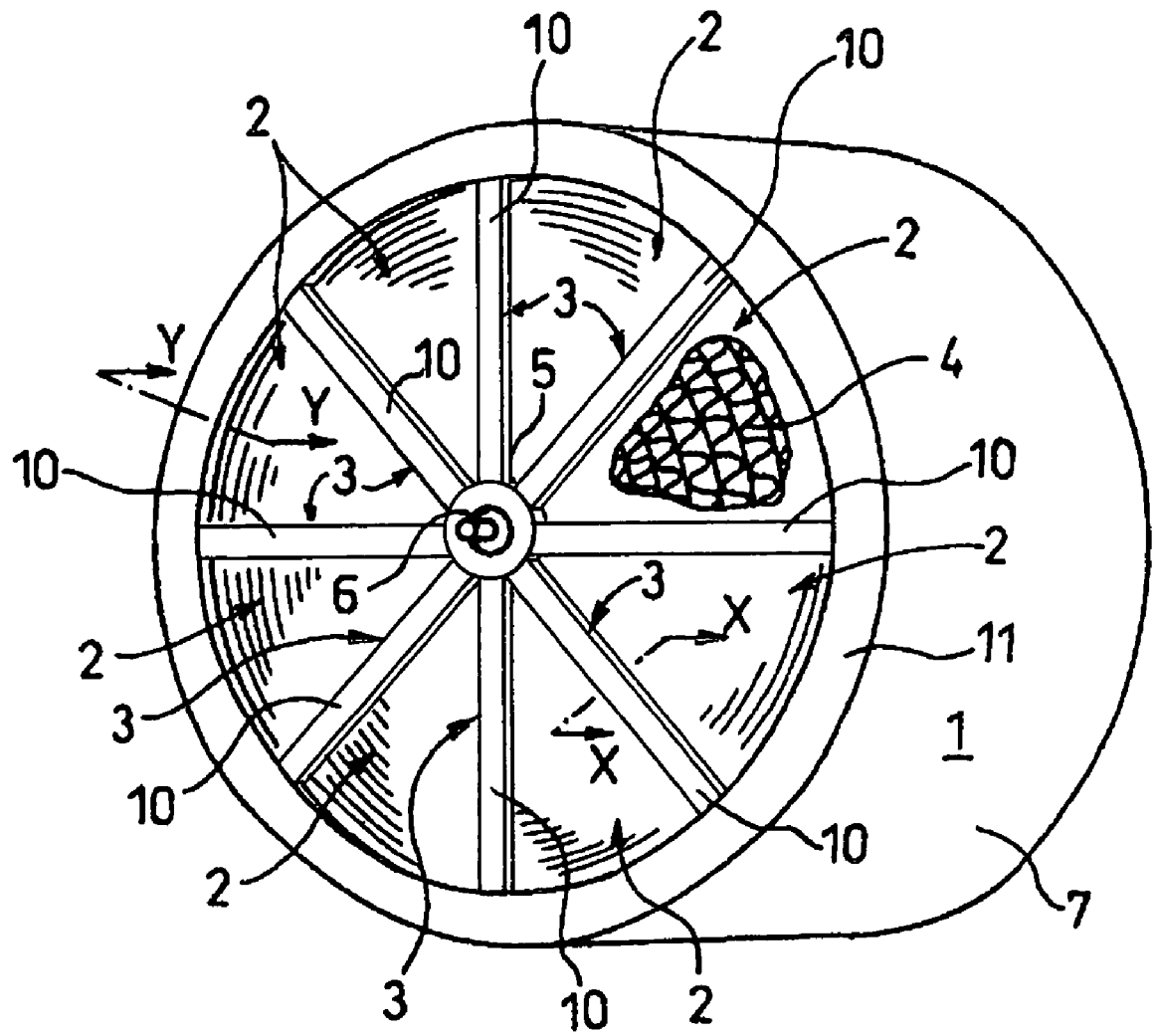
FIG. 2 is a perspective view of a rotor included in a dehumidifying device employed in the dehumidifying system of the present invention.
Figure 3:
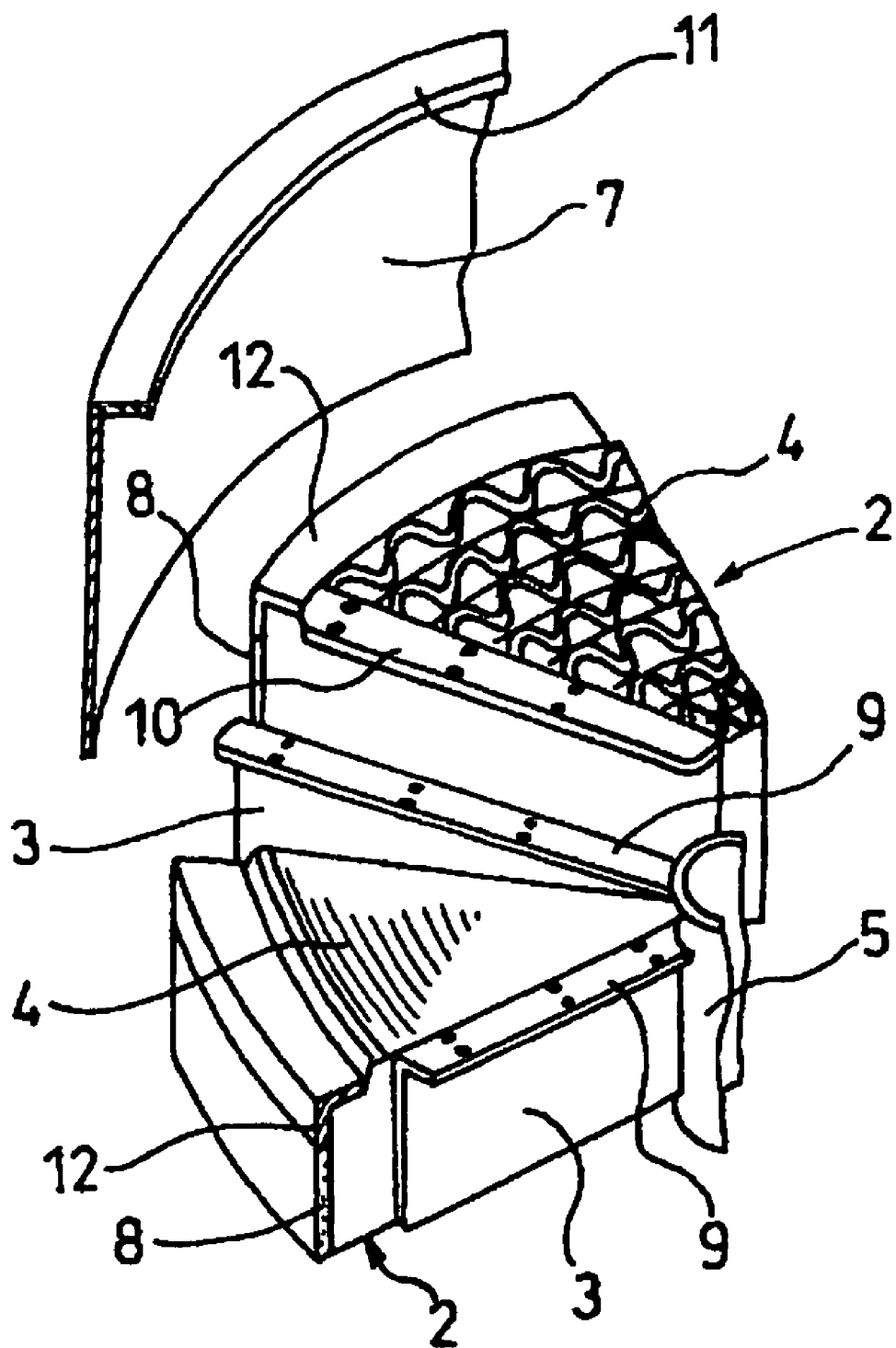
FIG. 3 is a fragmentary exploded perspective view of an insulating structure including a rim provided with a heat-insulating seal.

The silicon nitride plate 10 has a width greater than that of the holding plate 9 exposed on the end surface of the rotor 1. The silicon nitride plate 10 is formed in a width so that the silicon nitride plate 10 can be fitted in an axial groove of a rectangular cross section formed in the joint of the adjacent sector portions 2a and 2b on the opposite sides, respectively, of the spoke 3. The silicon nitride plate 10 is formed in a thickness so that the silicon nitride plate 10 may sink in the groove and may not protrude from the end surfaces M of the sector portions 2a and 2b. Formation of the silicon nitride plate 10 so that the silicon nitride plate 10 may not protrude from the end surfaces of the sector portions 2a and 2b is effective for the relation with a sealing device attached to the holding case 110 shown in FIG. 10. The rotor 1 shown in FIG. 2 is held in the holding case 110. As shown in FIG. 5 in an enlarged perspective view of the heat-insulating seal 10 and a sealing device 52, the holding case 110 is provided with the partition plates 111 (FIG. 10) defining the zones in the holding case 110 holding the rotor 1.

As shown in a sectional view, the sealing devices 52 are attached to the partition plates 111 of the holding case 110. The sealing devices 52 demarcate the regenerating zone U and the adsorbing zone S to prevent the leakage of gases from one to the other of the zones. Holding plates 53 for holding a sealing member 55 are fastened to the partition plate 111 with nuts 54. The sealing member 55 in sliding contact with the rotor 1 is supported by rods 57 fastened to connecting plates 56 attached to the partition plate 111 with the nuts 54. The connecting plates 56 extend perpendicularly to the holding plates 53.

A spring 58 is wound round each of the rods 57 so as to extend between the connecting plate 56 and the sealing member 55. The sealing member 55 is pressed elastically against the end surface M of the rotor 1 by the resilience of the springs 58 so that the sealing member 55 is able to slide along the end surface M of the rotor 1. Each sealing member 55 is provided with a cylindrical hole 55a, and a stopper 59 formed at the free end of the rod 57 is fitted in the cylindrical hole 55a. The stopper 59 has a shape substantially resembling a piston that is fitted slidably in the cylindrical hole 55a. The sealing member must have heat resistance, abrasion resistance and chemical stability. Suitable materials of the sealing member 55 are expanded graphite and graphite. Preferably, the springs 58 are formed of a stainless steel or Inconel®.

The sealing devices 52 attached to the partition plate 111 enable the sealing member 55 slide along the end surface M of the rotor 1. Since the silicon nitride plate 10 does not protrude from the end surface M of the rotor 1 as shown in FIG. 4, the silicon nitride plate 10 does not collide against the sealing member 55. Accordingly, even though the silicon nitride plate 10 is placed in the end surface M of the rotor 1 as shown in FIG. 4, the sealing member 55 is able to slide smoothly without colliding against the silicon nitride plate 10.

Figure 6:
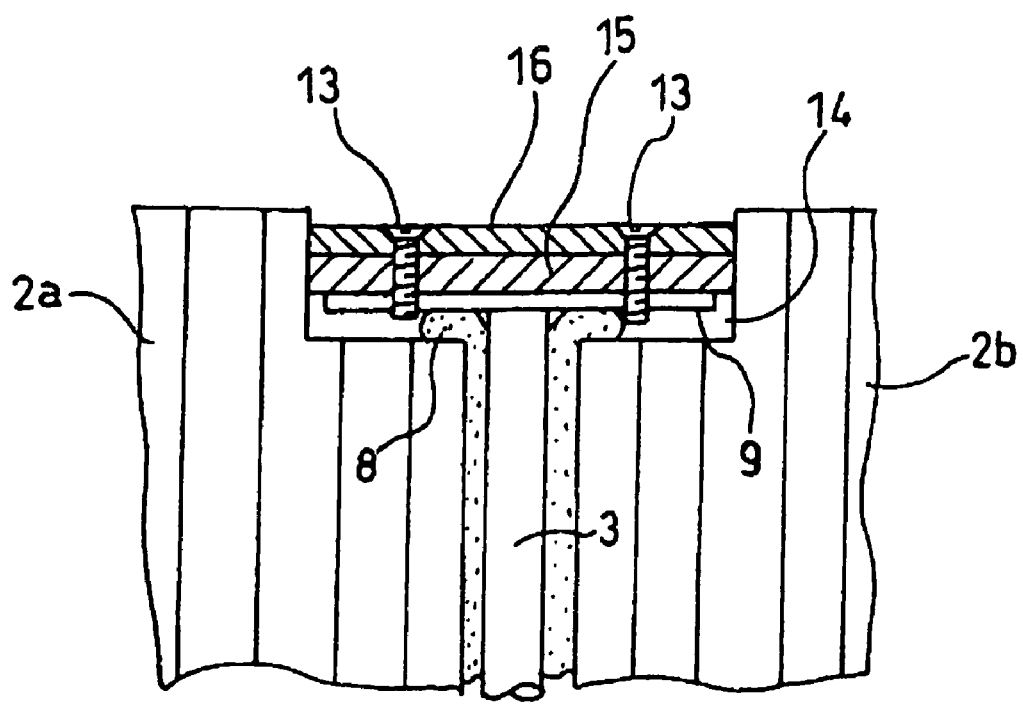
FIG. 6 is a view, similar to FIG. 3, of another heat-insulating structure placed in the joint of sectors.

An expanded graphite sheet 15 shown in FIG. 6 may be used instead of the silicon nitride plate. The expanded graphite sheet 15 covers the spoke 3, and the caulking material member 8 filling up gaps between the spoke 3 and the adjacent sector portions 2a and 2b to prevent the deterioration of the spoke 3 and the caulking material member. The expanded graphite sheet 15 may be overlaid with a metal sheet 16. The expanded graphite sheet 15 has high heat resistance. The metal sheet 16 covering the expanded graphite sheet 15 enhances the strength and durability of the expanded graphite sheet 15 to maintain the high heat-insulating effect of the expanded graphite sheet 15 for a long period of use. This laminated structure is applicable also to the heat-insulating seals 11 covering peripheral parts of the rotor 1.

Figure 7:
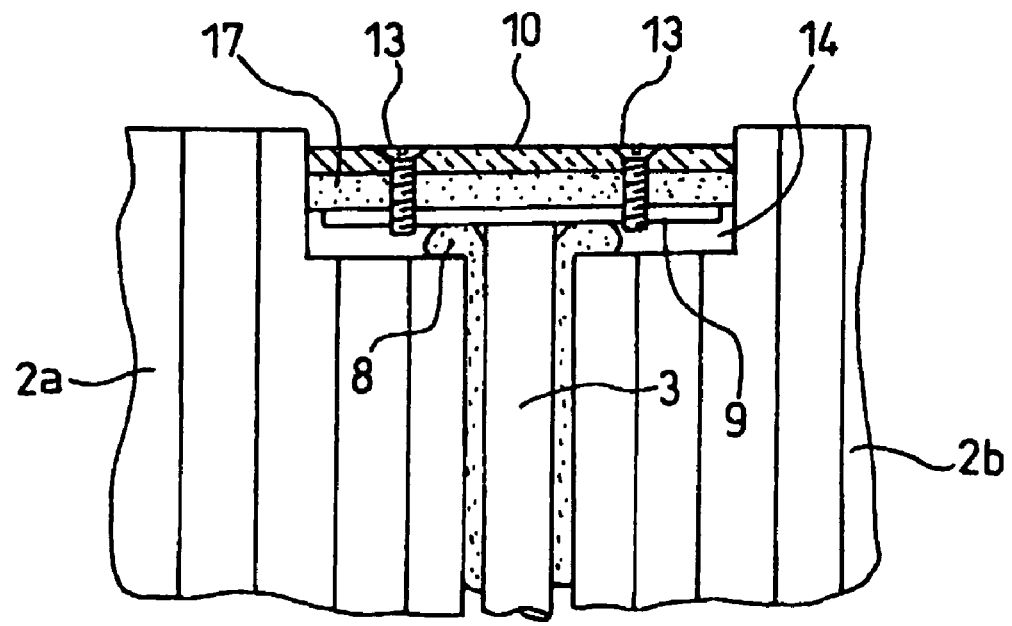
FIG. 7 is a view, similar to FIG. 3, of a third heat-insulating structure placed in the joint of sectors.

Heat insulation can be further improved by interposing a heat-insulating member 17, such as a calcium silicate plate, between the holding plate 9 of the spoke 3 and the silicon nitride plate 10 as shown in FIG. 7.

As shown in FIG. 8, a heat-insulating structure is formed on a peripheral part of the sector portion 2. The heat-insulating structure is formed by attaching a heat-insulating seal 11, such as a silicon nitride plate to the circumference of the metal rim 7. Even if a heated gas flows down, as viewed in FIG. 8, into the sector 2, the caulking material member 8 is protected by the heat-insulating seal 11 and the joints are protected from heat. Preferably, the heat-insulating seal 11 is underlaid with a metal angle 12 embedded in a peripheral part of the sector portion 2 as shown in FIG. 8. The heat-insulating seal 11 does not need necessarily to be underlaid with the metal angle 12.

The foregoing heat-insulating structure avoids directly exposing the joints of the sector portions 2 and the spokes 3 to the process gas and the high-temperature regenerating gas to prevent the temperature increase of the caulking material members 8. Consequently, reduction of sealing effect or bonding strength due to the degradation of the caulking material members 8 can be prevented.

The dehumidifying device A has a cooling zone T in addition to the adsorbing zone S and the regenerating zone U as shown in FIG. 11. A dehumidifying device having such zones is shown by way of example in a typical perspective view in FIG. 9, in which parts like or corresponding to those mentioned above are denoted by the same reference characters.

Second Embodiment

Figure 10:
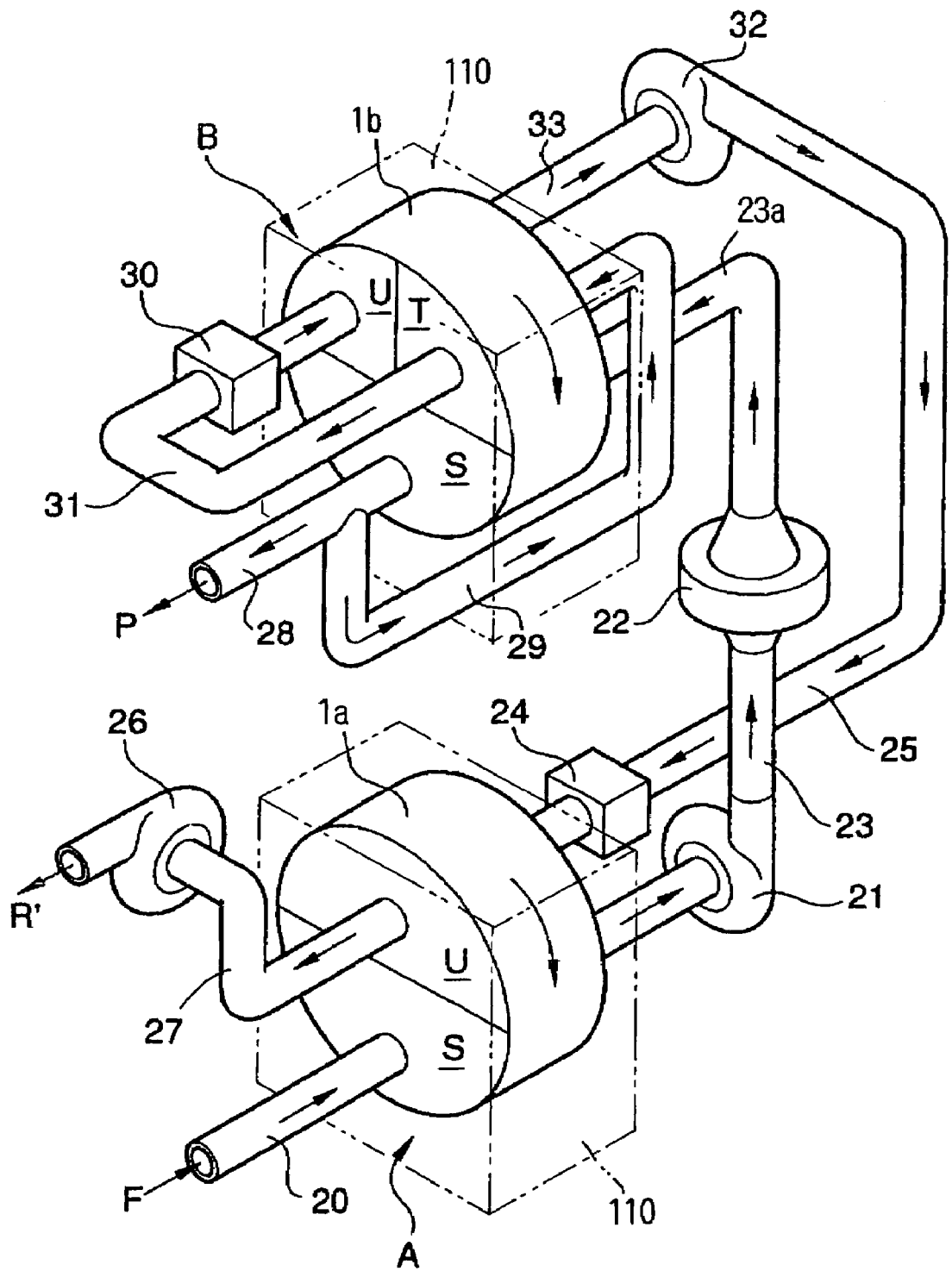
FIG. 10 is a schematic view of a dehumidifying system in a second embodiment according to the present invention.

Referring to FIG. 10, a dehumidifying system in a second embodiment according to the present invention has two dehumidifying devices A and B. The front dehumidifying device A and the back dehumidifying device B have holding cases 110, and rotors 1a and 1b respectively rotatably held in the holding cases 110, respectively.

An adsorbing zone S in the front dehumidifying device A is connected to an adsorbing zone S in the back dehumidifying device B. This dehumidifying system is of a two-stage type. The dehumidifying system in the second embodiment is capable of producing a clean, dry gas having a dew point lower than that of the clean, dry gas produced by the dehumidifying system in the first embodiment.

The front dehumidifying device A is similar to the dehumidifying device A of the first embodiment. The holding case 110 of the front dehumidifying device A holding the rotor 1a has the adsorbing zone S and a regenerating zone U. A process gas supply pipe (first supply line) 20 for carrying a process gas F into the dehumidifying device A is connected to the front surface of the adsorbing zone S of the holding case 110 holding the rotor 1a. A discharge pipe (first discharge line) 23 has one end connected to the back surface of the adsorbing zone S of the holding case 110 holding the rotor 1a and the other end connected to a process gas supply pipe (first supply line) 23a connected to the front surface of the adsorbing zone S of the holding case 110 holding the rotor 1b. The discharge pipe 23 is provided with a cooler 22. A supply pipe (second supply line) 25 has one end connected to the back surface of the regenerating zone U of the front dehumidifying device A and the other end connected to a discharge pipe (second discharge line) 33 connected to the back surface of the regenerating zone U of the holding case 110 of the back dehumidifying device B. A heater 24 is placed between the supply pipe 25 and the front dehumidifying device A. A waste gas discharge pipe (second discharge line) 27 is connected to the front surface of the regenerating zone U of the front dehumidifying device A. The waste gas discharge pipe 27 is connected to a fan 26.

The back dehumidifying device B, similarly to the front dehumidifying device A, may be the same as the dehumidifying device A of the first embodiment. In the second embodiment, interior of the holding case 110 of the back dehumidifying device B holding the rotor 1b is divided by partition plates 111 to define a cooling zone T in addition to the adsorbing zone S and the regenerating zone U. The supply pipe 23a connected to the discharge pipe 23 connected to the front dehumidifying device A is connected to the back surface of the adsorbing zone S of the holding case 110 holding the rotor 1b. A discharge pipe (first discharge line) 28 is connected to the front surface of the adsorbing zone S of the holding case 110 holding the rotor 1b. A branch pipe 29 branches off from the discharge pipe 28. A desired clean, dry gas P having a low dew point is discharged through the discharge pipe 28. The branch pipe 29 is connected to the back surface of the cooling zone T of the back dehumidifying device B. A regenerating gas supply pipe (second supply line) 31 provided with a heater 30 is connected to the front surface of the cooling zone T of the back dehumidifying device B. A discharge pipe 33 provided with a fan 32 and communicating with the regenerating zone U of the front dehumidifying device A is connected to the back surface of the regenerating zone U of the back dehumidifying device B.

The rotor 1a, similarly to the rotor 1 of the first embodiment, is formed by joining a plurality of sector portions impregnated with an adsorbent and having a sectorial cross section. Heat-insulating structures similar to those of the first embodiment are incorporated into joints in the rotors 1a and 1b. The rotor 1a adsorbs high-boiling organic compounds. The rotor 1b may use rare earth element-substituted aluminosilicate as an adsorbent. The adsorbent does not need to be limited to the rare earth element-substituted aluminosilicate, but may be any other suitable adsorbent, such zeolite, activated carbon or silica gel. The zeolite may be A-type zeolite, X-type zeolite or Y-type zeolite.

The process gas F is carried through the supply pipe 20 into the adsorbing zone S of the front dehumidifying device A and is dehumidified and cleaned by the adsorbent born through the rotor 1a to produce a clean, dry gas. The clean, dry gas thus produced has a dew point on the order of −35° C. The clean, dry gas cooled by the cooler 22 flows into the adsorbing zone S of the back dehumidifying device B and is further dehumidified and cleaned to produce a low-dew-point clean, dry gas P having a dew point on the order of −80° C. The low-dew-point clean, dry gas P is discharged through the discharge pipe 28.

Part of the low-dew-point clean, dry gas P flowing through the branch pipe 29 into the cooling zone T of the back dehumidifying device B serves as a cooling gas. The low-dew-point clean, dry gas P passed through the cooling zone T is heated by the heater 30 at a temperature between about 130 and about 200° C. to produce a hot regenerating gas. The hot regenerating gas flows into the regenerating zone U of the back dehumidifying device B to evaporate and eliminate moisture and gaseous impurities adsorbed by the adsorbent of the rotor 1b from the adsorbent of the rotor 1b. Then, the fan 32 delivers the hot regenerating gas discharged from the regenerating zone U through the discharge pipe 33 to the regenerating zone U of the front dehumidifying device A. The hot regenerating gas discharged from the regenerating zone U of the back dehumidifying device B is heated by the heater 24 at a temperature between about 130 and about 200° C. before the same, and then flows into the regenerating zone U of the front dehumidifying device A. The hot regenerating gas supplied into the regenerating zone U of the front dehumidifying device A evaporates and eliminates moisture and gaseous impurities adsorbed by the adsorbent of the rotor 1a from the adsorbent of the rotor 1a. A waste gas R', i.e., the hot regenerating gas used for regeneration by the front dehumidifying device A, is discharged through the waste gas discharge pipe 27.

In the second embodiment, moisture and gaseous impurities (organic substances) adsorbed by the adsorbent of the rotor 1a are removed by the agency of the hot regenerating of a temperature between about 130 and about 200° C. when the front dehumidifying device A is in the normal operation. High-boiling organic compounds adsorbed by the adsorbent employed in the present invention cannot be eliminated by the hot regenerating gas of such a temperature. Since the rotors 1a and 1b are provided with the heat-insulating structures, a regenerating gas heated at a temperature effective in eliminating the high-boiling organic compounds can be used. Although a method of regenerating the adsorbent is dependent on the operating mode of the dehumidifying devices, it is preferable to pass the regenerating gas heated at a temperature between about 250 and about 400° C. at a velocity of 1 m/s or higher to eliminate high-boiling organic compounds from the adsorbents when the high-boiling organic compounds are accumulated in the adsorbents in a period in the range of about six months to about two years. A suitable regenerating time is in the range of about 6 to about 15 hr.

EXAMPLES

Examples and comparative examples will be described, which is not limitative to the present invention.

Example 1

Dehumidifying System (1)

A paper sheet of 0.2 mm in thickness and 0.25 g/cm$^3$ in density was made by processing a fiber blend prepared by blending alumina silica fibers and a small amount of organic synthetic fibers. A corrugated sheet provided with wavy ridges of 1.9 mm arranged at pitches of 3.3 mm was made by processing the paper sheet, and the corrugated sheet was processed to build honeycomb structures having a sectorial cross section as shown in FIG. 2. The honeycomb structures were impregnated with a slurry prepared by mixing an adsorbent having a composition: 6% $La_2O_3$, 3% $Na_2O$, 2% $Nd_2O_3$, 2% $CeO_3$, 2% $Pr_6O_{11}$, 27% $Al_2O_3$, 58% $SiO_2$ and silica gel as an organic binder, and the honeycomb structures impregnated with the slurry was dried and baked to remove the organic substances to obtain sector portions 2 having a sectorial cross section.

The eight sector portions 2 were bonded together to build a cylindrical rotor 1 as shown in FIG. 2. Caulking material members 8 were placed in joints of the adjacent joining surfaces of the sector portions 2a and 2b, spokes 3 and a rim 7. Heat-insulating seals 10, such as silicon nitride plates, were fastened to the end surfaces of spokes 3 with screws. Heat insulating seals 11, such as silicon nitride plates, were attached to the rim 7 as shown in FIG. 8.

A single-stage dehumidifying system (1) as shown in FIG. 1 was completed by holding the rotor 1 in a holding case, not shown, having an adsorbing zone S and a regenerating zone U.

Comparative Example 1

Dehumidifying System (2)

Sector portions 2 having a sectorial cross section similar to those of Example 1 were fabricated except that A-type zeolite was used as an adsorbent instead of aluminosilicate containing La. The eight sector portions 2 were bonded together to build a cylindrical rotor 1. Caulking material members 8 were placed in joints of the adjacent joining surfaces of the sector portions 2, spokes 3 and a rim 7. The rotor 1 was not provided with any heat-insulating seals corresponding to the heat-sealing seals 11.

A single-stage dehumidifying system (2) as shown in FIG. 1 was completed by holding the rotor 1 in a holding case, not shown, having an adsorbing zone S and a regenerating zone U.

Performance Evaluation 1

Air containing 1000 ppb NMP (N-methyl-2-pyrrolidone) was passed through the dehumidifying systems (1) and (2) at a rate of 20 m$^3$/min to process the air continuously. Typical high-boiling organic compounds that are produced from solvents that are used for semiconductor device fabricating processes are MEA, dimethyl sulfoxide (DMSO), hexamethyldisilazane (HMDS) and propylene glycol monoethyl ether acetate (PGMEA). Among those high-boiling organic compounds, NMP has the highest boiling point of 204° C. Clean, dry gases obtained by passing the air containing NMP through the dehumidifying systems (1) and (2) were analyzed by gas chromatography to determine NMP elimination ratios. An NMP elimination ratio achieved by the dehumidifying system (1) was as high as 99.9%, whereas an NMP elimination ratio achieved by the dehumidifying system (2) was as low as 80%. It is known from the results of performance evaluation that aluminosilicate containing La employed in the present invention has a high high-boiling organic compound adsorbing ability.

Example 2

Dehumidifying System (3)

A two-stage dehumidifying system (3) having a front dehumidifying device and a back dehumidifying device shown in FIG. 10 was fabricated. The rotor 1 of the dehumidifying system (1) was used as a rotor 1a for the front dehumidifying device. The back dehumidifying device was provided with a rotor 1b built by joining eight sector portions 2 having a sectorial cross section and impregnated with X-type zeolite as an adsorbent. The rotor 1b was held in a holding case 110 having an adsorbing zone S, a regenerating zone U and a cooling zone T as shown in FIG. 10. Any heat-sealing structures were not incorporated into the rotor 1b of the back dehumidifying device.

Comparative Example 2

Dehumidifying System (4)

A two-stage dehumidifying system (4) having a front dehumidifying device and a back dehumidifying device was fabricated. The two-stage dehumidifying system (4) was the same in construction as the dehumidifying system (3) in Example 2, except that the rotor 1 of the dehumidifying system (2) was used as a rotor 1a for the front dehumidifying device.

Performance Evaluation 2

Air containing 1 to 2 ppm high-boiling organic compounds including MEA, DMSO, HMDS, PGMEA and NMP was passed through the adsorbing zone S of the holding case holding the rotor 1a of the dehumidifying system (3) at a velocity in the range of 1 to 2 m/s to clean the air. A high-boiling organic compound elimination ratio achieved by the dehumidifying system (3) was approximately equal to that achieved by the dehumidifying system (1). A clean, dry gas produced by the dehumidifying system (3) had a dew point of −80° C.

The dehumidifying system (4) was operated for the same process. A high-boiling organic compound elimination ratio achieved by the dehumidifying system (4) was approximately equal to that achieved by the dehumidifying system (2). A clean, dry air produced by the dehumidifying system (4) had a dew point of −75° C.

It is known from the results of performance evaluation that the dehumidifying system according to the present invention is capable of eliminating high-boiling organic compounds at a high high-boiling organic compound elimination ratio and of producing a clean, dry gas having a low dew point.

The dehumidifying system (3) and the dehumidifying system (4) were operated continuously for a cleaning operation for six months, in which the rotors were operated for 24 hr a day. Then, the rotors 1a of the front dehumidifying devices of the dehumidifying system (3) and the dehumidifying system (4) were regenerated by passing high-temperature air of 300° C. for 12 hr through the rotors 1a. The rotors were measured before and after regeneration for organic substance content, pore volume and specific surface area. The organic substance content was determined by pulverizing a 10 cm sq. specimen sampled from the rotor 1a into powder and measuring 30 mg of the powder by a thermal differential weighing device. Pore volume is the volume of pores in the adsorbent of a unit weight of 1 kg. Pore volume was determined by cutting out a rectangular specimen of 2 mm by 10 mm from the rotor 1, measuring the specimen of 1 g for pore volume by a BJH method (Barpett-Joyner-Halenda method) and converting the measured pore volume into a pore volume per 1 kg. Specific surface area is the surface area of the adsorbent per unit weight of 1 g. Specific surface area was determined by sampling a rectangular specimen of 2 mm by 10 mm from the rotor 1a and measuring the specimen for specific surface area by a BET method using nitrogen gas.

The rotor 1a used for six months was removed from the dehumidifying system, the rotor was washed by immersing the rotor 1a in water of a volume fifteen times that of the rotor 1a for five minutes, and the washed rotor was measured for organic substance content, pore volume and specific surface area for comparison. Similarly, an unused rotor 1a was measured for organic substance content, pore volume and specific surface area.

As is apparent from Table 1 showing measured data, whereas the organic substances could not be satisfactorily eliminated from the rotor by washing, the organic substances were able to be eliminated from the rotor at a high elimination ratio by regeneration using high-temperature air. Whereas the pore volume of the rotor regenerated by washing was as low as about 34% of that of the unused rotor 1a, the pore volume of the rotor regenerated by using high-temperature air was about 85% of that of the unused rotor 1a. Whereas the specific surface area of the rotor regenerated by washing was as low as about 36% of that of the unused rotor 1a, the specific surface area of the rotor regenerated by using high-temperature air was about 95% of that of the unused rotor 1a. Thus it is known that regeneration according to the present invention using high-temperature air is effective.

TABLE 1

| Regenerating condition | Organic substance content (% by weight) | Pore volume (cm³/kg) | Specific surface area (m²/g) |
|---|---|---|---|
| Not regenerated | 19.2 | 2.5 | 4.0 |
| High-temperature air | 0.4 | 60.0 | 121.2 |
| Water washing | 4.1 | 24.0 | 45.7 |
| Unused | 0.0 | 70.7 | 127.9 |

After the completion of the test operation, the dehumidifying system (3) was disassembled, and the rotor 1a of the front dehumidifying device was examined. The caulking material members placed in the joints of the sectors of the dehumidifying system (3) were not deteriorated, which proved the effectiveness of the heat-insulating structure of the present invention.

As is apparent from the foregoing description, according to the present invention, organic substances including high-boiling organic compounds can be eliminated, and a clean, dry gas having a low dew point can be produced. The dehumidifying system of the present invention is capable of withstanding a high-temperature gas of a temperature exceeding 300° C., have the construction capable of regenerating the adsorbent by eliminating moisture and high-boiling organic substances adsorbed by the adsorbent, is a high-performance dehumidifying system and has a long service life.

The invention claimed is:

1. A dehumidifying system including a dehumidifying device capable of removing moisture and organic substances from a process gas, wherein the dehumidifying device includes:
   a holding case, and
   a rotor rotatably held in the holding case and having a plurality of individual sector portions having a sectorial cross section divided from each other, each bearing adsorbent capable of adsorbing moisture and organic substances;
   at least an adsorbing zone and a regenerating zone are defined in the holding case holding the rotor by partition plates attached to the holding case, a first supply line for supplying a process gas and a first discharge line for discharging the process gas are connected to the adsorbing zone of the holding case holding the rotor, a second supply line for supplying a regenerating gas and a second discharge line for discharging the regenerating gas are connected to the regenerating zone of the holding case holding the rotor, and
   moisture and organic substances adsorbed by the adsorbent of the rotor in the adsorbing of the rotor zone of the holding case holding the rotor are eliminated from the adsorbent of the rotor in the regenerating zone with a high-temperature regenerating gas of a temperature between 250 and 400° C., and the adsorbent has aluminosilicate produced by substituting sodium atoms of hydrophilic zeolite by one or some of La, Nd, Ce and Pr.

2. The dehumidifying system according to claim 1, wherein the dehumidifying device consists of first and second dehumidifying devices, the first discharge line connected to the adsorbing zone of the first dehumidifying device is connected to the first supply line connected to the adsorbing zone of the second dehumidifying device, and
   the first discharge line connected to the second dehumidifying device is connected to an objective space.

3. The dehumidifying system according to claim 2, wherein
   a gas cooling device is interposed between the first discharge line connected to the adsorbing zone of the first dehumidifying device and the first supply line connected to the adsorbing zone of the second dehumidifying device.

4. The dehumidifying system according to claim 2, wherein
   the second discharge line connected to the regenerating zone of the second dehumidifying device is connected to the second supply line connected to the regenerating zone of the first dehumidifying device.

5. The dehumidifying system according to claim 4, wherein
   a heater is interposed between the second discharge line connected to the regenerating zone of the second dehumidifying device and the second supply line connected to the regenerating zone of the first dehumidifying device.

6. The dehumidifying system according to claim 1, wherein the process gas is air, oxygen gas or an inert gas.

7. The dehumidifying system according to claim 1, wherein the interior of the holding case holding the rotor is divided into an adsorbing zone, a regenerating zone and a cooling zone by a partition plate attached to the holding case.

8. The dehumidifying system according to claim 1, wherein the rotor is provided with a honeycomb structure having many small pores and bearing the adsorbent.

9. The dehumidifying system according to claim 8, wherein each of the sector portions of the honeycomb structure of the rotor bears the adsorbent, the sector portions are connected by spokes, and heat-insulating seals are held between the sector portions and the spokes.

10. The dehumidifying system according to claim 9, wherein the heat-insulating seals are silicon nitride plates, expanded graphite sheets or laminates each consisting of an expanded graphite sheet and a metal plate.

11. The dehumidifying system according to claim 1, wherein the adsorbent is a rare earth element-substituted aluminosilicate having a chemical composition indicated by: $aM_xO_y.bNa_2O.cAl_2O_3.dSiO_2.eH_2O$, where M is a rare earth element, the rare earth element-substituted aluminosilicate contains one or some of $La_2O_3$, $Nd_2O_3$, $CeO_3$ and $Pr_6O_{11}$ as $aM_xO_y$, 5% by weight or less $Na_2O$ as $bNa_2O$, 10 to 35% by weight $Al_2O_3$ as $cAl_2O_3$ and 20 to 80% by weight $SiO_2$ as $dSiO_2$.

12. The dehumidifying system according to claim 1, wherein the process gas contains organic substances respectively having boiling points not lower than 200° C.

13. A dehumidifying method using a dehumidifying system including a dehumidifying device, including a holding case and a rotor rotatably held in the holding case and having a plurality of individual sector portions having a sectorial cross section divided from each other, each bearing an adsorbent capable of adsorbing moisture and organic substances, at least an adsorbing zone and a regenerating zone being defined in the holding case holding the rotor by partition plates attached to the holding case, said dehumidifying method comprising the steps of:

passing a process gas through the adsorbing zone of the holding case holding the rotor to adsorb moisture and organic substances contained in the process gas by the adsorbent of the rotor; and passing a high-temperature regenerating gas of a temperature between 250 and 400° C. through the regenerating zone of the holding case holding the rotor to eliminate moisture and organic substances adsorbed by the adsorbent from the adsorbent;

wherein the adsorbent has aluminosilicate obtained by substituting some of sodium atoms of hydrophilic zeolite by one or some of La, Nd, Ce and Pr.

14. The dehumidifying method according to claim 13, wherein the dehumidifying device consists of first and second dehumidifying devices, and the dehumidifying method further comprises the steps of:

passing the process gas which has passed through the adsorbing zone of the first dehumidifying device through the adsorbing zone of the second dehumidifying device, and supplying the process gas which has passed through the adsorbing zone of the second dehumidifying device into an objective space.

15. The dehumidifying method according to claim 14, wherein part of the process gas which has passed through the adsorbing zone of the second dehumidifying device is supplied into the objective space, and the rest of the process gas which has passed through the adsorbing zone of the second dehumidifying device is heated and then supplied into the regenerating zone of the first dehumidifying device.

16. The dehumidifying method according to claim 13, wherein the process gas is air, oxygen gas or inert gas.

17. The dehumidifying method according to claim 13, wherein the process gas contains organic substances respectively having boiling points not lower than 200° C.

* * * * *